T. VOGT.
PROCESS FOR THE PREPARATION OF STONE SLABS.
APPLICATION FILED NOV. 2, 1910.

1,018,458.

Patented Feb. 27, 1912.

UNITED STATES PATENT OFFICE.

THEODOR VOGT, OF HEILIGENBERG, GERMANY.

PROCESS FOR THE PREPARATION OF STONE SLABS.

1,018,458.      Specification of Letters Patent.      Patented Feb. 27, 1912.

Application filed November 2, 1910. Serial No. 590,287.

*To all whom it may concern:*

Be it known that I, THEODOR VOGT, a subject of the King of Prussia, residing at Heiligenberg, in Alsace-Lorraine, Germany, have invented certain new and useful Improvements in Processes for the Preparation of Stone Slabs, of which the following is a specification.

My invention relates to a process for the manufacture of blocks or slabs from pieces of stone, and especially from hard stone fragments. The paving of side walks, yards, and the like can be easily and quickly effected by the aid of such slabs, and the work becomes much cheaper with equal or even greater suitability of the paving. Owing to the fact that the surface is separated by little interstices, the slab can never become so slippery as with a completely plane surface, and the coating with ice is more or less prevented, so that there are many advantages connected with the practical use of the invention. The usefulness of the slabs is continuously increasing inasmuch as the cement forming the connecting element, becomes constantly harder in the air.

The process consists in embedding the stones in cement and pouring cement liquor over them. In order, however, to prevent this cement liquor attaching itself to the upper surface of the stones also, from which it could only be removed after drying with great trouble, the upper surface of the stones is coated with a somewhat greasy preparation so that on lightly striking the same the cement poured can fall away and any remains thereof which still adhere can easily be washed off. As a suitable material for this coating, a solution of the deposit "lette", or loam found in sand stone crevices has been proved when dissolved in water to be serviceable, which solution, after being well diluted is applied to the surface of the stones which are then subsequently poured over with cement.

Figure 1:
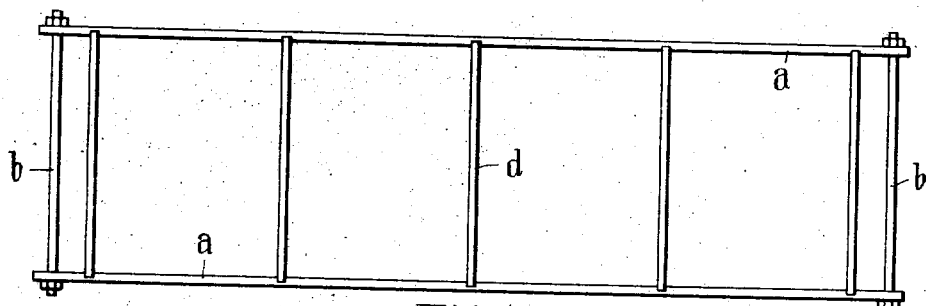
Figure 2:
Figure 3:
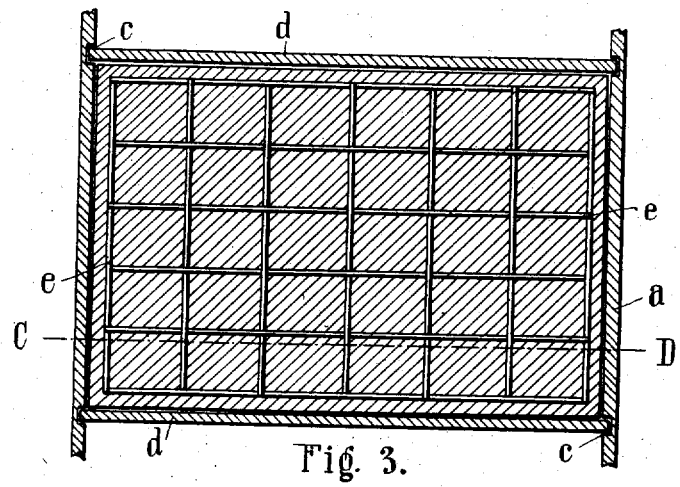

An apparatus suitable for carrying out the process constituting the present invention is shown in the accompanying drawing, in which:

Figure 1 is a plan view of one of the iron frames used in the manufacture of the stone slabs; Fig. 2 is a vertical section through one of the stone slabs while in the process of formation; and Fig. 3 is a sectional plan through the cement mass showing the interwoven rods hereinafter referred to.

The apparatus employed consists of iron frames of which the two longitudinal sides $a$ are held together by means of the screws $b$ at their ends. The cross bars $d$ rest in grooves $c$ of the longitudinal bars, whereby the surface is subdivided into divisions corresponding to the requisite size of the slabs. In these divisions there is then placed a mixture of sand and cement to about one quarter of the height, and interwoven rods $e$ placed upon it, and preferably a layer of pure cement placed on top in which the stones $f$ are so set that little interstices are formed in any desired arrangement or in the manner of stone joinings. As suitable stone for this purpose may be used granite, porphyry, hard sandstone, graywacke, or the like. The upper surface of the stones is then treated with the greasy mass, preferably that already described, and afterward cement liquid is poured over said upper surface. After drying, the deposit resting upon the stone surface can easily be brushed and washed off and the slab can be used at once. The kind of stones, the thickness of the slabs, and so forth, can be adjusted as may be required by the special circumstances.

I claim:

1. Process for the preparation of stone slabs, which consists in inserting a mass of sand and cement in a suitable frame and embedding a network of interwoven bars in said mass, then embedding stones in said mass in such a manner that interstices are formed between them, and then pouring cement liquid over the upper surface of the body so as to fill in said interstices.

2. Process for the preparation of stone slabs, which consists in inserting a cement mass in a suitable frame and embedding a network of interwoven bars in said mass, then embedding stones in said mass in such a manner that interstices are formed between them, then applying a greasy substance to the upper surface of the stones which is adapted to resist cement liquid, and finally filling in said interstices between the stones with cement liquid.

3. Process for the preparation of stone slabs, which consists in inserting a layer consisting of sand and cement in a suitable frame, then placing a wide-meshed network of interwoven bars upon said layer, then placing a layer of pure cement over said first named layer and said interwoven bars, then embedding stones in said layer of cement in such a manner that interstices are formed between them, and then pouring cement liquid over the upper surface of the body so as to fill in said interstices.

4. Process for the preparation of stone slabs, which consists in inserting a layer consisting of sand and cement in a suitable frame, then placing a wide-meshed network of interwoven bars upon said layer, then placing a layer of pure cement over said first named layer and said interwoven bars, then embedding stones in said layer of cement in such a manner that interstices are formed between them, then applying a greasy substance to the upper surfaces of the stones which is adapted to resist cement liquid, and finally filling in said interstices between the stones with cement liquid.

5. Process for the preparation of stone slabs, which consists in inserting a layer consisting of sand and cement in a suitable frame, then placing a wide-meshed network of interwoven bars upon said layer, then placing a layer of pure cement over said first named layer and said interwoven bars, then embedding pieces of granite in said layer of cement in such a manner that interstices are formed between them, then applying a greasy substance consisting of a solution of "lette" to the upper surfaces of the pieces of granite, and finally filling in said interstices with cement liquid.

In testimony whereof I affix my signature in presence of two witnesses.

THEODOR VOGT.

Witnesses:
SIEGFRIED HAUSER,
AUGUST OOSTERMAN.

---

Copies of this patent may be obtained for five cents each, by addressing the "Commissioner of Patents, Washington, D. C."